United States Patent [19]

Appleby et al.

[11] 4,325,764
[45] Apr. 20, 1982

[54] DRUM AND METHOD OF SHAPING A RADIAL TIRE

[75] Inventors: Paul E. Appleby, Cuyahoga Falls; Henry D. Broyles, Akron; John E. Hill, Akron; Arland A. Peck, Akron, all of Ohio

[73] Assignee: The Goodyear Tire & Rubber Company, Akron, Ohio

[21] Appl. No.: 161,055

[22] Filed: Jun. 19, 1980

[51] Int. Cl.³ ............................................. B29H 17/26
[52] U.S. Cl. ................................. 156/123 R; 156/398; 156/416
[58] Field of Search ................... 156/123 R, 131–133, 156/398, 415, 416, 417, 414

[56] References Cited

U.S. PATENT DOCUMENTS

| | | |
|---|---|---|
| 3,107,192 | 10/1963 | McNenney . |
| 3,402,090 | 9/1968 | Henley . |
| 3,485,692 | 12/1969 | Frazier . |
| 3,492,184 | 1/1970 | Brey et al. ............................ 156/414 |
| 3,518,149 | 6/1970 | Mirtain ................................ 156/133 |
| 3,580,782 | 5/1971 | LeBlond . |
| 3,822,165 | 7/1974 | Habert . |
| 3,922,187 | 11/1975 | DeNardis ............................ 156/123 |
| 3,923,572 | 12/1975 | Garver . |
| 3,925,141 | 12/1975 | Coretta . |
| 4,011,126 | 3/1977 | Eichholz et al. .................... 156/398 |
| 4,144,114 | 3/1979 | Enders ................................. 156/414 |
| 4,207,133 | 6/1980 | Bottasso ............................. 156/415 |
| 4,214,939 | 7/1980 | Enders ................................. 156/132 |
| 4,243,451 | 1/1981 | Kortman ............................. 156/132 |

Primary Examiner—John E. Kittle
Attorney, Agent, or Firm—Frederick K. Lacher; T. P. Lewandowski

[57] ABSTRACT

A radial tire carcass fabricated by a first stage process has bead portions which are placed over a pair of spaced-apart coaxial bead seats. The bead seats may be segmented radially expandable rings which are expanded by fluid pressure into engagement with the bead portions. The tire carcass is initially positioned on the drum with the bead seats at a spaced-apart distance so that upon expansion of the segments of the bead seats at a low pressure and axial movement apart of the bead seats the ply of the tire carcass is stretched and the bead portions moved into register on the bead seats. The fluid pressure expanding the segments of the bead seats is then increased to secure the bead portions on the bead seats at predetermined positions with a predetermined diameter. Annular sealing members may be mounted on the segments of the bead seats at the tire-supporting surfaces of the segments for compression upon application of high pressure. The sealing members may also have flaps for bridging the space between the bead portions of the tire and mounting rings for the segments of the bead seats so that the tire may be inflated after registration of the bead portions and while the bead seats are moved axially together for the application of the tread and belt ply.

11 Claims, 7 Drawing Figures

DRUM AND METHOD OF SHAPING A RADIAL TIRE

This invention relates generally, as indicated, to a method and apparatus of building tires and especially to the shaping and expansion of a radial tire carcass fabricated by a first stage process. In the past, the first stage carcass has been placed over a drum with expandable bead seats; however, it has been difficult to register the bead portions on the bead seats and then secure the bead portions in the registered positions for axial movement during the shaping process. In some cases the bead portions have been registered and secured on the drum but the reinforcing cords of the tire plies have been distorted and this has adversely affected the quality of the tire. In other cases it has been difficult to keep the bead portions in the registered positions on the bead seats during the shaping and axial movement of the bead seats. There have also been problems providing a seal between the bead seats and the bead portions especially where the drum has segmented bead seats.

Another problem has been the need to have a large number of different size bead seat rings to accommodate the different diameter bead portions for different size first stage carcasses. These problems are especially critical for drums where the tire bead portions are gripped at the inside and no shaping diaphragm or bag is utilized to expand the tire.

The present invention is directed to a shaping drum and method wherein the bead portions of the tire are automatically moved into the registered positions on the bead seats without distorting the reinforcing cords and are then secured on the bead seats in the registered positions. Distortion of the cords is avoided by expanding the segmented bead seat rings and moving them into engagement with the bead portions of the tire at the registered positions at one pressure and then securing them in the registered positions at a higher pressure. An annular sealing member of resilient material is also mounted on each of the bead seats for compression to further secure the bead portions on the bead seats and also accommodate different diameter bead portions.

In accordance with an aspect of the invention, a radial tire building machine shaping drum rotatable about an axis is provided which comprises a segmented radially expandable inboard ring, a segmented radially expandable outboard ring spaced axially from said inboard ring, said outboard ring and said inboard ring each having a plurality of separate radially movable drum segments slidably mounted at circumferentially spaced positions on corresponding mounting rings, means for radially moving said drum segments, each of said drum segments having a radially outer supporting surface for engagement with bead portions of the tire upon radially outward movement of said segments, means for axially moving said outboard ring and said inboard ring in opposite directions to spread and contract the bead portions of the tire and means for inflating the tire mounted on said outboard and inboard rings.

In accordance with another aspect of the invention, a method of building a radial tire is provided which includes the steps of A. fabricating at a first location a first stage tire carcass including at least one radial ply in generally cylindrical form extending between a pair of annular inextensible beads located at spaced-apart bead portions;

B. placing said carcass about tire shaping means at a second location with said bead portions being supported on a pair of bead seats;

C. positioning said bead seats coaxially and at a spaced-apart distance less by a predetermined amount than the distance between said spaced-apart bead portions of said first stage tire carcass;

D. expanding said bead seats radially by fluid pressure to engage circumferentially said bead portions;

E. moving said bead seats axially apart by a distance sufficient to register said bead portions on said bead seats and exert an axial tension on said radial ply;

F. expanding said bead seats radially to a predetermined diameter by increasing said fluid pressure to secure said bead portions on said bead seats in the registered positions;

G. moving said bead seats and said bead portions together while radially expanding said radial ply therebetween for the application of a belt ply and tread; and H. retracting said bead seats and removing said fabricated and shaped tire from said tire shaping means.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 1:
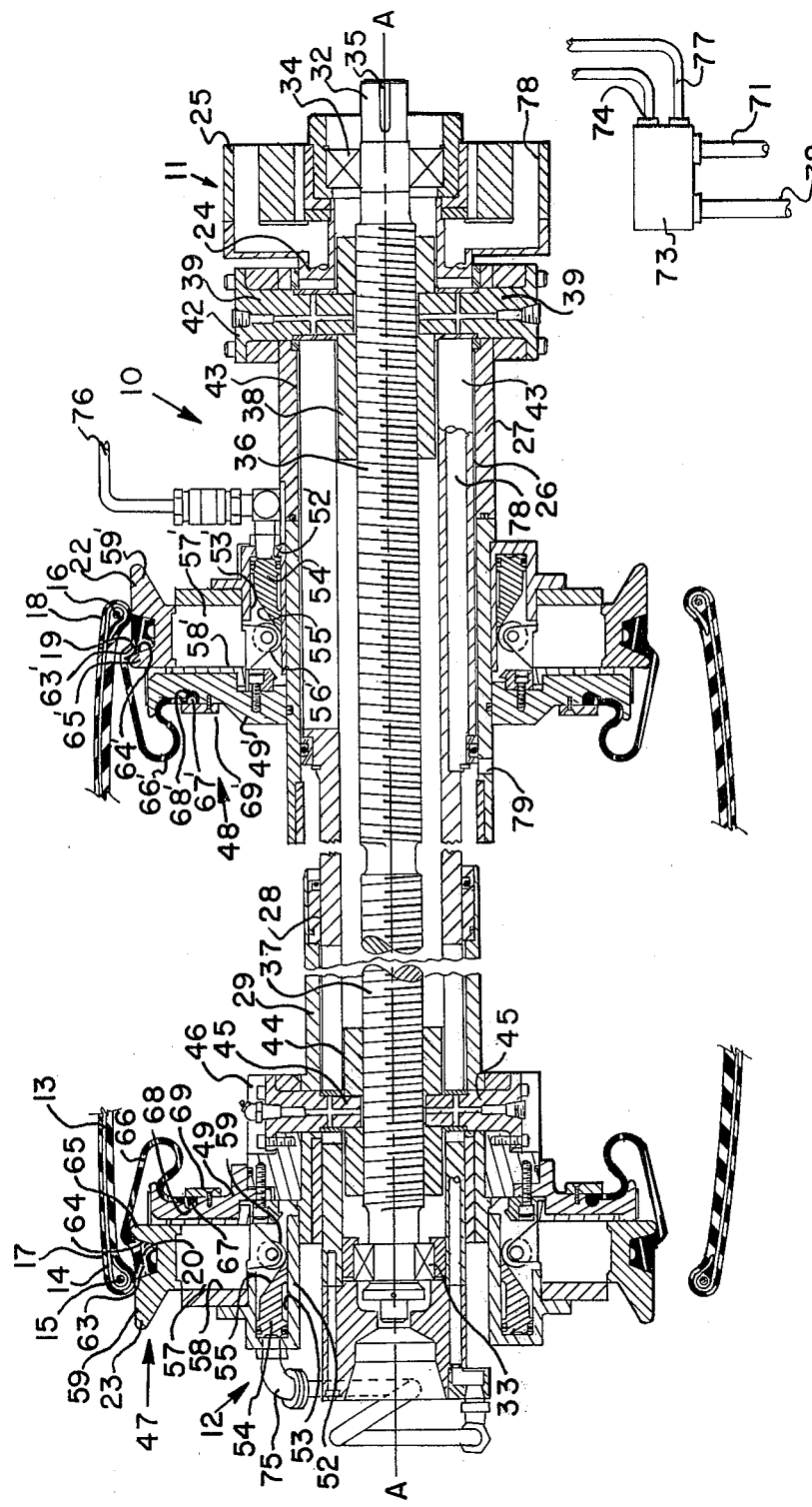
FIG. 1 is a partially schematic, sectional side elevation of the shaping drum embodying the invention with parts being broken away.

Referring to FIG. 1, a radial tire building machine shaping drum 10 is shown. An inboard end 11 is adapted for mounting on a housing (not shown) containing a drive and clutches for operating the drum. An outboard end 12 is in a spaced-apart position from the inboard end 11 and positioned so that a first stage radial tire carcass 13 may be placed over the outboard end and hung on the shaping drum 10 as shown in FIG. 1.

The radial tire carcass 13 of the type which is shaped on the drum 10 is generally fabricated at a first location and includes at least one generally cylindrical radial ply 14 extending between a pair of annular inextensible beads 15 and 16 located at spaced-apart bead portions 17 and 18, respectively. Bead seats 19 and 20, respectively, are provided by a segmented radially expandable inboard ring 22 for supporting bead portion 18 and a segmented radially expandable outboard ring 23 for supporting bead portion 17. The drum 10 including the inboard and outboard rings 22 and 23 is rotatable about an axis A—A of the drum.

Tire drum shaft 24 which extends from the inboard end 11 to the outboard end 12 has a flanged end 25 which is adaptable for mounting to the main shaft (not shown) of the housing (not shown) to support the drum 10 in a cantilever fashion. The tire drum shaft 24 is rotatable about the axis A—A and has an inboard cylindrical surface 26 for supporting an inboard sliding sleeve 27 carrying the segmented radially expandable inboard ring 22.

At the outboard end 12 of the tire drum shaft 24, an outboard cylindrical surface 28 is provided for supporting an outboard sliding sleeve 29 carrying the segmented radially expandable outboard ring 23. Rotatably mounted within and coaxially of the cylindrical tire drum shaft 24 is a drive screw 32 supported on bearings 33 and 34 for rotation independently of the tire drum shaft. The inboard end of the drive screw 32 may have a keyway 35 and be engageable with a separate drive (not shown) to rotate the screw in a clockwise or counterclockwise direction. The inboard end of the screw 32 has a left-hand threaded portion 36 and the outboard end of the screw has a right-hand threaded portion 37. An inboard threaded nut 38 is engageable with the left-hand threaded portion 36 of the screw 32 and connected to the inboard sliding sleeve 27 by radially extending pins 39 which are part of an inboard cylindrical flange 42 and are movable axially of the drum 10 in slots 43 in the inboard end of the cylindrical tire drum shaft 24. With this construction, the inboard threaded nut 38 may be moved axially and carry the inboard sliding sleeve 27 in the same direction by rotating the drive screw 32. In a similar manner, the outboard right-hand threaded portion 37 of the drive screw 32 is engaged by an outboard threaded nut 44 which is connected to the outboard sliding sleeve 29 by pins 45 connected to an outboard cylindrical flange 46 for axial movement of the outboard sliding sleeve upon rotation of the drive screw.

Figure 2:
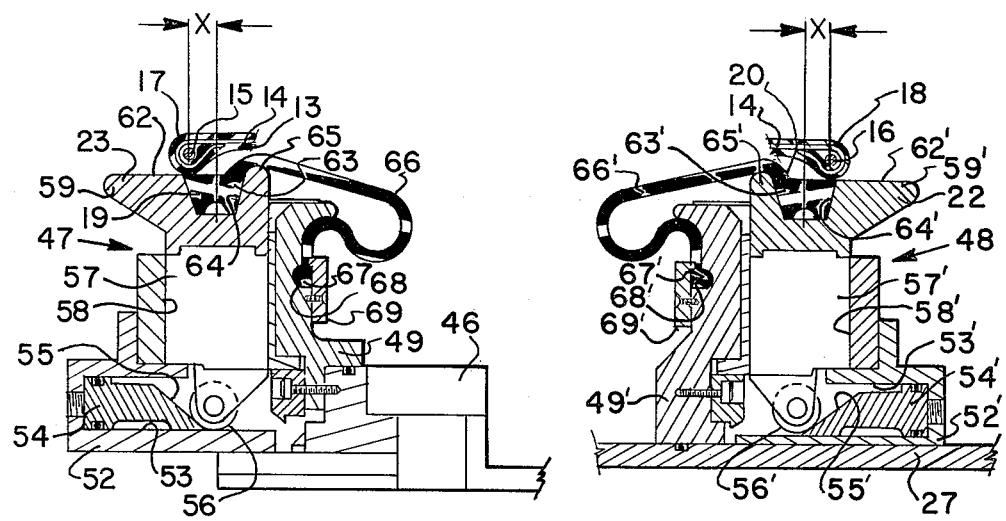
FIG. 2 is an enlarged schematic sectional view of the upper portion of the bead seat assemblies in the position shown in FIG. 1.

Mounted on the inboard sliding sleeve 27 and the outboard sliding sleeve 29 are an outboard bead seat assembly 47 and in inboard bead seat assembly 48. These assemblies 47 and 48 are substantially the same except that one is a mirror image of the other and therefore the following description of the outboard bead seat assembly 47 will also apply to the inboard bead seat assembly 48. Reference is also made to FIG. 2 which shows the assemblies 47 and 48 on an enlarged scale.

Connected to the pins 45 and the outboard flange 46 is an outboard mounting ring 49 which is fastened to a housing 52. The housing 52 may be of several parts fastened together but is generally cylindrical and contains a ring cylinder 53 in which a ring piston 54 is slidably mounted for movement in an axial direction. The ring piston 54 has a sloped cam surface 55 engageable with a plurality of circumferentially spaced cam followers 56 rotatably mounted on a plurality of circumferentially spaced radially movable slides 57 contained in slots 58 of the housing 52.

Figure 7:
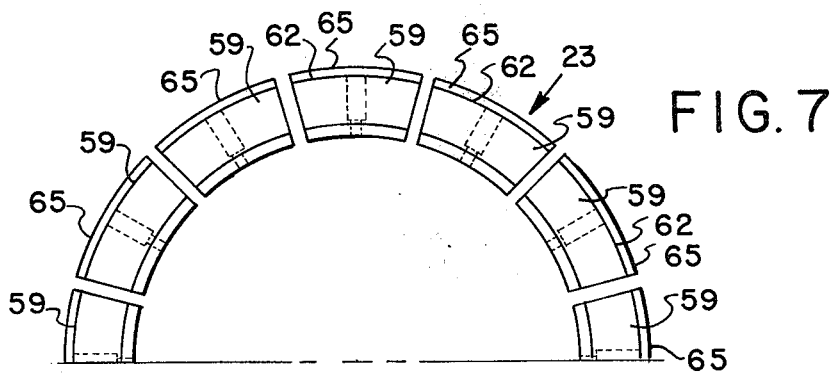
FIG. 7 is an end view of the bead seat segments of one of the segmented radially expandable rings which are expanded and contracted radially into and out of engagement with the bead portions of the tire.

Separate radially movable drum segments 59 of the segmented radially expandable outboard ring 23 are mounted on the slides 57 with suitable fasteners for radial movement with the slides in response to movement of the ring piston 54. As shown in FIG. 7, the outboard ring 23 which is a mirror image of the inboard ring 22 includes a plurality of circumferentially spaced segments 59 mounted for radial movement. Each of the segments 59 of the outboard ring 23 has a radially outer supporting surface 62 which is generally cylindrical and positioned for engagement with the bead portion 17 of the radial tire carcass 13.

An annular sealing member 63 which may have a wedge shape is positioned in circumferentially extending grooves 64 in the supporting surface 62 of the drum segments 59. An indentation in the sealing member 63 provides a space at the bottom of the groove 64 for the sealing member to move upon compression of the sealing member when the drum segments 59 are moved radially outward into engagement with the bead portions 17 of the tire carcass 13.

At the inboard edge of the drum segments 59 nearest the inboard ring 22 is a radially extending flange 65 providing the bead seat 20 against which the bead portions 17 may be seated upon axial movement of the segments into engagement with the bead portions. An annular flap 66 extends axially from the annular sealing member 63 over the radially extending flange 65 and is mounted in sealing engagement with the outboard mounting ring 49. The flap 66 may have an enlarged bead 67 at one edge and be held in a groove 68 by a clamp ring 69. Other seals between parts of the drum 10 may be provided so that the tire carcass 13 may be inflated during the shaping process.

Air under pressure is provided through conduit 71 from a source of air pressure such as an air compressor or a plant air supply to a pressure regulator 73. Vacuum may also be provided through conduit 72 from a vacuum pump or plant vacuum supply line. Vacuum and air pressure is communicated through a conduit 74 which is connected to the ring cylinder 53 of the outboard bead seat assembly 47 by suitable piping 75 connected to the ring cylinder and extending through the tire drum shaft 24. The conduit 74 may also be connected to the ring cylinder 53' of the inboard bead seat assembly 48 by suitable piping 76. The pressure regulator 73 has controls for providing a vacuum during one part of the drum operation, air at a low pressure of about 30 pounds per square inch during another part of the drum operation and air at a high pressure of from 80 to 100 pounds per square inch during still another part of the drum operation.

An inflation conduit 77 connects the pressure regulator 73 with the space within the tire through a passage 78 in the flanged end 25 and tire drum shaft 24 and through an opening 79 in the inboard sliding sleeve 27. The pressure regulator 73 has suitable controls for providing different pressures within the tire carcass 13 as it is being shaped and during the application of the belt and tread.

To identify the parts of the inboard bead seat assembly 48 which correspond with the parts of the outboard bead seat assembly 47 described hereinabove they will be identified for purposes of this description by adding a prime mark to the number identifying the part in the outboard bead seat assembly so that, for example, the ring cylinder of the inboard bead seat assembly 48 will be designated 53' which corresponds with the ring cylinder 53 of the outboard bead seat assembly 47.

Referring to FIGS. 1 through 6, the preferred operation of the shaping drum 10 is illustrated for shaping a radial tire carcass 13 which has been fabricated at a first location and is then moved to a second location where the shaping drum 10 is located. As shown in FIGS. 1 and 2, the tire carcass 13 is positioned over the drum 10 with the bead portions 17 and 18 supported on the supporting surfaces 62 and 62' of the outboard and inboard bead seat assemblies 47 and 48. Preferably the bead seats 19 and 20 are located at a spaced-apart distance less by a predetermined amount X at each assembly than the distance between the bead portions 17 and 18 of the tire carcass 13. This amount X may be approximately one inch making a total difference or predetermined amount of two inches. The positions of the outboard bead seat assembly 47 and inboard bead seat assembly 48 are set by rotating the drive screw 32 and thereby moving the inboard threaded nut 38 and outboard threaded nut 44 to the desired position.

Figure 3:
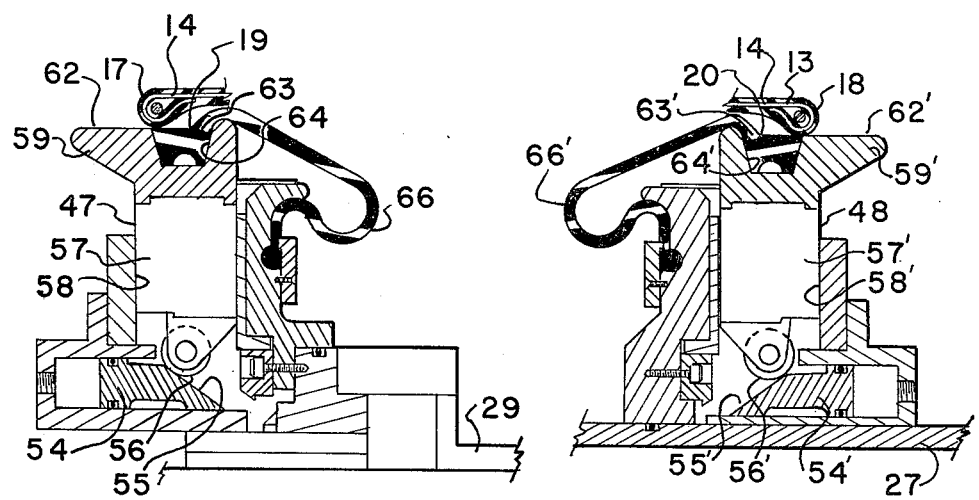
FIG. 3 is a sectional view like FIG. 2 showing the bead seats in the partially expanded condition upon initial engagement of the entire bead seat ring with the bead portions of the tire.
Figure 4:
FIG. 4 is a fragmentary sectional view like FIG. 3 showing the position of the bead portions in register with the bead seats in the partially expanded condition.

After the tire carcass 13 is positioned on the supporting surfaces 62 and 62' of the bead seat assemblies 47 and 48 as shown in FIGS. 1 and 2, the pressure regulator 73 is actuated and air at low pressure, which may be around 30 pounds per square inch, is communicated through conduit 74 and piping 75 and 76 to the ring cylinders 53 and 53' causing the ring pistons 54 and 54' to move towards the cam followers 56 and 56' and urge them radially outward by engagement with cam surfaces 55 and 55'. At this low pressure the bead portions 17 and 18 of the tire carcass 13 are engaged circumferentially by the supporting surfaces 62 and 62' as shown in FIG. 3; however, insufficient force is exerted against the bead portions to distort the cords of the radial ply 14. While the bead portions 17 and 18 are circumferentially engaged by the supporting surfaces 62 and 62' the drum screw 32 is rotated causing the nuts 38 and 44 to move axially apart and carry the bead seat assemblies 47 and 48 to the position shown in FIG. 4 where the bead portions are registered on the bead seats 19 and 20 with the bead portions pressing against the radially extending flanges 65 and 65' so as to stretch the tire carcass 13 and exert an axial tension on the radial ply 14.

Figure 5:
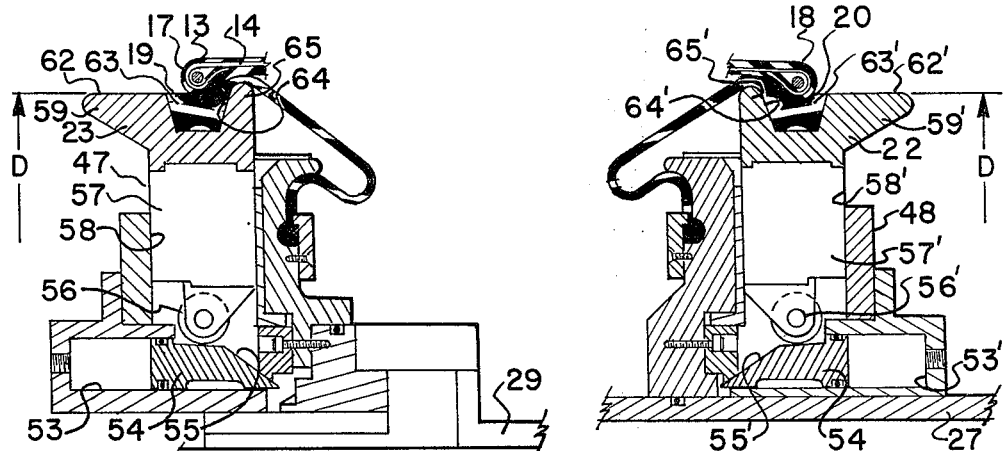
FIG. 5 is a sectional view like FIGS. 1 and 2 showing the bead seats in the fully expanded condition and the bead portions secured on the bead seats.

With the bead portions 17 and 18 in registry, the pressure regulator 73 is actuated to increase the pressure in the ring cylinders 53 and 53' to a higher pressure of from about 80 to 100 pounds per square inch so as to move the ring pistons 54 and 54' to the stop positions shown in FIG. 5 in which the cam followers 56 and 56' are lifted radially outward a maximum amount and expand the bead seats 19 and 20 of the inboard ring 22 and outboard ring 23 so that the supporting surface 62 and 62' has a predetermined diameter D and the annular sealing members 63 and 63' will be compressed to secure the bead portions in the registered positions. This compression is facilitated by the spaces at the base of the annular sealing members 63 and 63' for accommodating the compressed resilient material of the sealing members.

Figure 6:
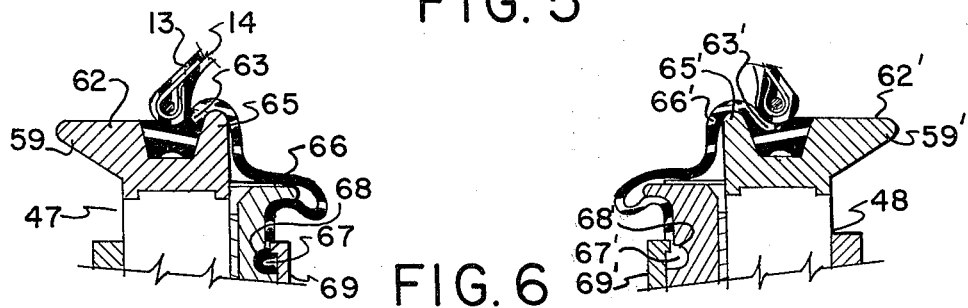
FIG. 6 is a fragmentary sectional view like FIG. 4 showing the bead seats and annular sealing member as the tire is inflated and the bead seats moved axially together.

After the bead portions 17 and 18 have been secured on the supporting surfaces 62 and 62' as shown in FIG. 5, the pressure regulator 73 is actuated to provide inflation air through the passage 78 and opening 79 into the tire. At the same time the drum screw 32 is rotated so as to move the nuts 38 and 44 axially together which results in radially expanding the radial ply 14 of the tire carcass 13 into a position where a belt ply and tread (not shown) may be applied in a manner well known in the art. The pressure regulator 73 may provide lower or higher inflation pressures in the tire carcass 13 to assist in pressing the carcass against the belt ply and tire tread and provide support during stitching of the band. As shown in FIG. 6, the annular sealing members 63 and 63' with the annular flaps 66 and 66' are pressed against the outboard bead seat assembly 47 and inboard bead seat assembly 48 providing a seal to retain the air under pressure within the tire carcass 13 and the drum 10. After the tire carcass 13 has been shaped and the belt ply and tread applied, the pressure regulator 73 is actuated to release the pressure in the tire carcass and apply a vacuum to the ring cylinders 53 and 53' which will permit the outboard bead seat assembly 47 and inboard bead seat beat assembly 48 with the outboard ring 23 and inboard ring 22 to retract radially so that the fabricated and shaped tire may be removed from the shaping drum 10.

While a certain representative embodiment and details have been shown for the purpose of illustrating the invention, it will be apparent to those skilled in the art that various changes and modifications may be made therein without departing from the spirit or scope of the invention.

We claim:

1. A radial tire building machine shaping drum rotatable about an axis comprising a segmented radially expandable inboard ring, a segmented radially expandable outboard ring spaced axially from said inboard ring, said outboard ring and said inboard ring each having a plurality of separate radially movable drum segments slidably mounted at circumferentially spaced positions on corresponding mounting rings, means for radially moving said drum segments, each of said drum segments having a generally cylindrical radially outer supporting surface with a bead seat for engagement of said surface with one of the bead portions of the tire before seating on said bead seat upon radially outward movement of each of said segments, means for axially moving said outboard ring and said inboard ring in opposite directions to seat said bead portions on said bead seat on each of said drum segments and to spread and contract the bead portions of the tire, and means for inflating the tire mounted on said outboard and inboard rings.

2. A shaping drum in accordance with claim 1 wherein an annular sealing member for each of said radially expandable rings is disposed on said supporting surface of each of said drum segments for compression upon radially outward movement of said drum segments into engagement with the bead portions of the tire.

3. A shaping drum in accordance with claim 2 wherein said annular sealing member of each of said segmented radially expandable rings has an annular flap for sealing engagement with the corresponding mounting ring on which said drum segments are supported to retain fluid pressure in the tire mounted on said inboard and outboard rings.

4. A shaping drum in accordance with claim 2 wherein each of said drum segments has a circumferentially extending groove for retaining said annular sealing member.

5. A shaping drum in accordance with claim 4 wherein said supporting surface of each of said drum segments on one of the segmented radially expandable rings has a radially extending flange at the edge nearest to the other segmented radially expandable ring and said flap extends over said flange between the tire bead portion and said supporting surface when the tire bead portions are seated on said segments.

6. A shaping drum in accordance with claim 5 wherein said flap has an enlarged bead at one edge and a clamp ring disposed over said flap adjacent said bead and fastened to the corresponding mounting ring for clamping said flap to said mounting ring in fluid-tight relationship.

7. A shaping drum in accordance with claim 1 wherein said means for radially moving said drum segments includes fluid pressure means, pressure regulating means for providing a first lower pressure to urge said segments into engagement with the bead portions of the tire at one diameter prior to seating of the bead portions on said bead seats so that said bead portions can slide into a seating position upon movement of said outboard ring axially away from said inboard ring to stretch the tire and said pressure regulating means further providing a second high pressure to expand said segments to a predetermined diameter of the bead portions after the bead portions are seated.

8. A shaping drum in accordance with claim 7 wherein an annular sealing member is disposed on said supporting surface for compression upon expansion of said segments to said predetermined diameter in response to said second high pressure after the bead portions are seated.

9. A method of building a radial tire comprising:
   A. fabricating at a first location a first stage tire carcass including at least one radial ply in generally cylindrical form extending between a pair of annular inextensible beads located at spaced-apart bead portions;
   B. placing said carcass about tire shaping means at a second location with said bead portions being supported on a pair of supporting surfaces having bead seats;
   C. positioning said bead seats coaxially and at a spaced-apart distance less by a predetermined amount than the distance between said spaced-apart bead portions of said first stage tire carcass;
   D. expanding said supporting surfaces radially by fluid pressure to engage circumferentially said bead portions;
   E. moving said supporting surfaces axially apart by a distance sufficient to register said bead portions on said bead seats and exert an axial tension on said radial ply;
   F. expanding said bead seats radially to a predetermined diameter by increasing said fluid pressure to secure said bead portions on said bead seats in the registered positions;
   G. moving said bead seats and said bead portions together while radially expanding said radial ply therebetween for the application of a belt ply and tread; and
   H. retracting said bead seats and removing said fabricated and shaped tire from said tire shaping means.

10. The method of building a radial tire in accordance with claim 9 wherein each of said bead seats includes an annular sealing member of resilient material which is compressed upon expansion of the respective bead seat to said predetermined diameter for securing the respective bead portion on the corresponding bead seat.

11. The method of building a radial tire in accordance with claim 9 wherein during moving of said bead seats and said bead portions together after securing of said bead portions on said bead seats, fluid under pressure is introduced into said tire carcass and prior to removal of said tire carcass from said tire shaping means fluid pressure in said tire is decreased.

* * * * *